Aug. 26, 1969     A. G. SEIPOS     3,462,787
SWINGABLE AND ELEVATABLE CONVEYANCE LOADER SYSTEM
Original Filed Oct. 17, 1966     5 Sheets-Sheet 1
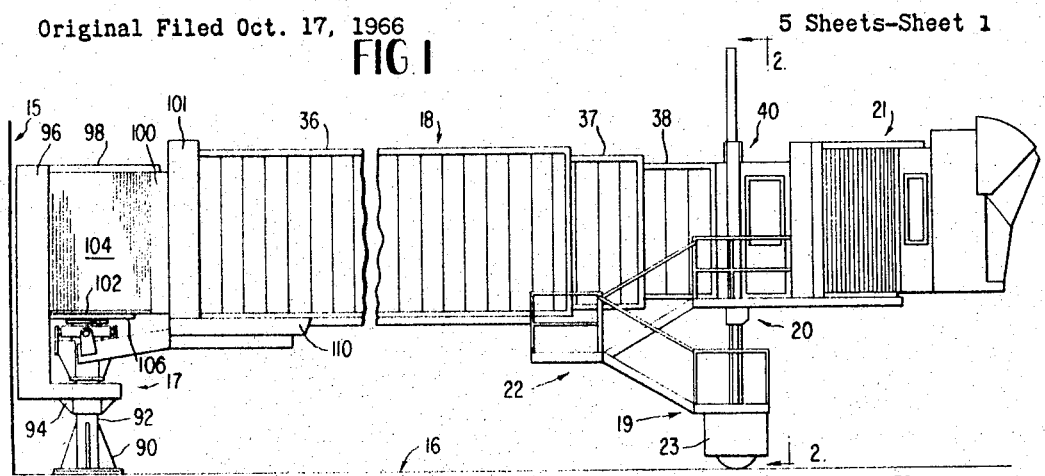
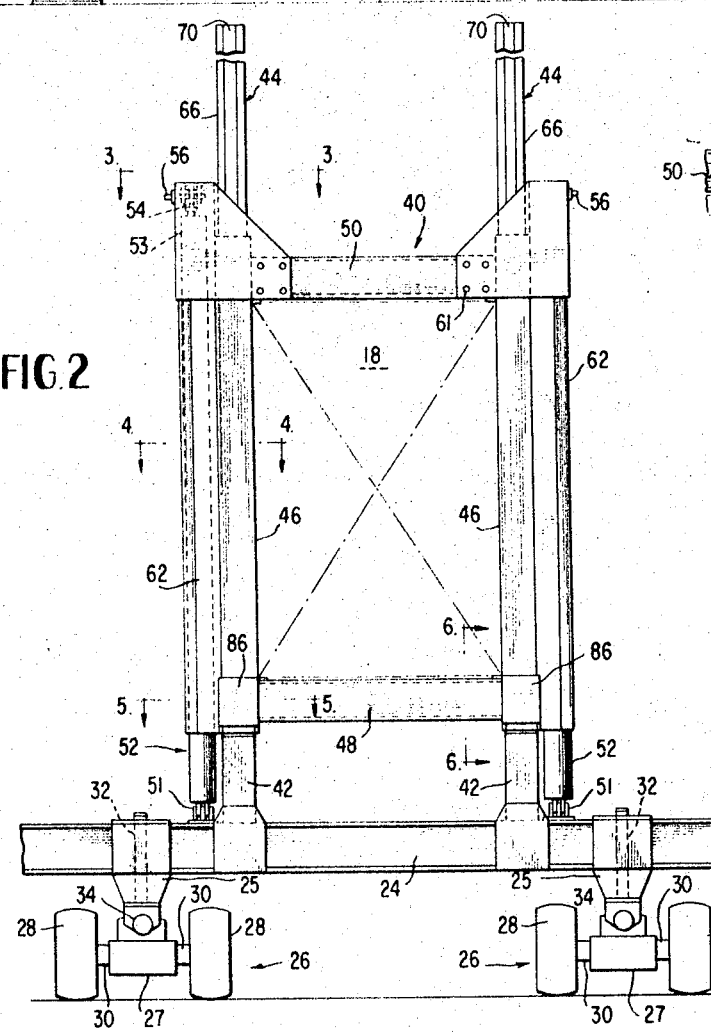
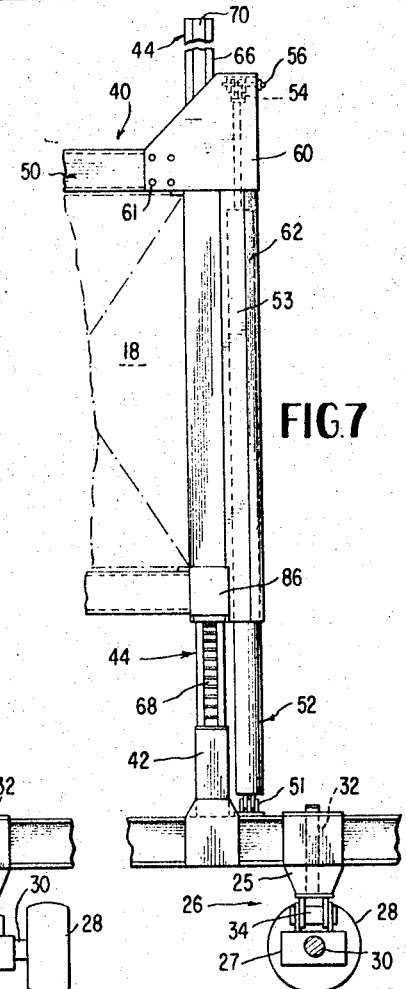
ANDREW G. SEIPOS, INVENTOR
BY Shanley & O'Neil
ATTORNEYS INVENTOR.
ANDREW G. SEIPOS
BY Shanley & O'Neil
ATTORNEYS

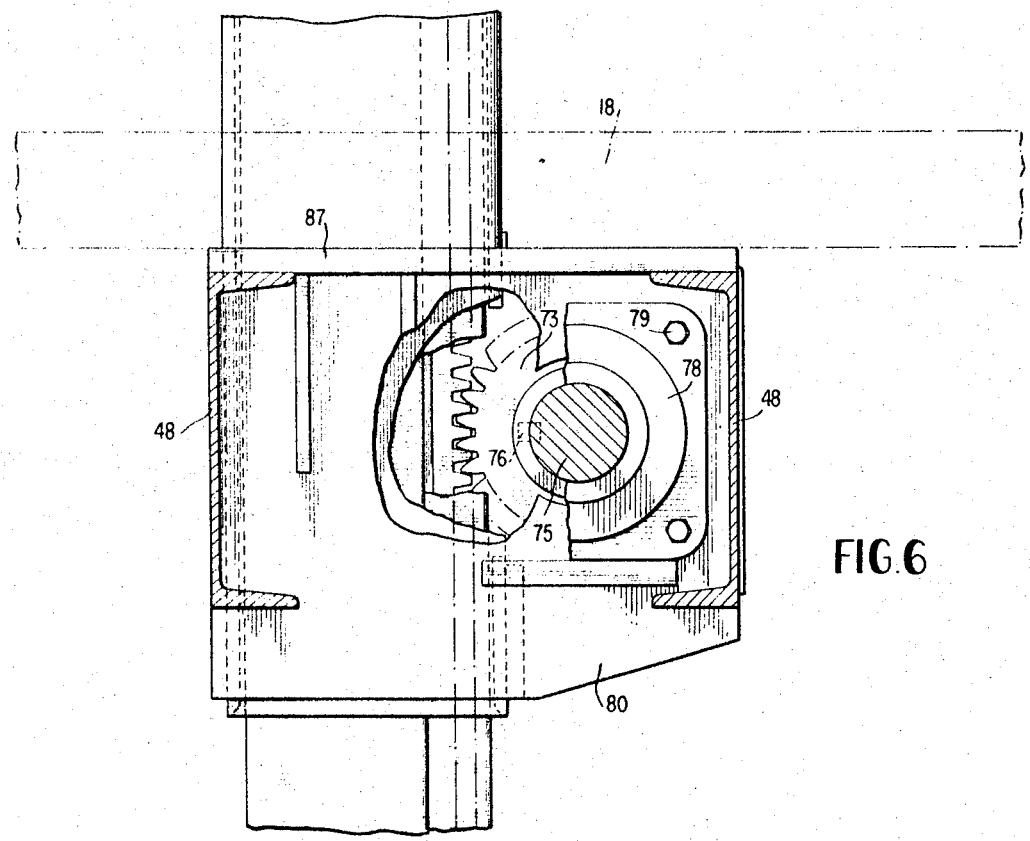
FIG. 6
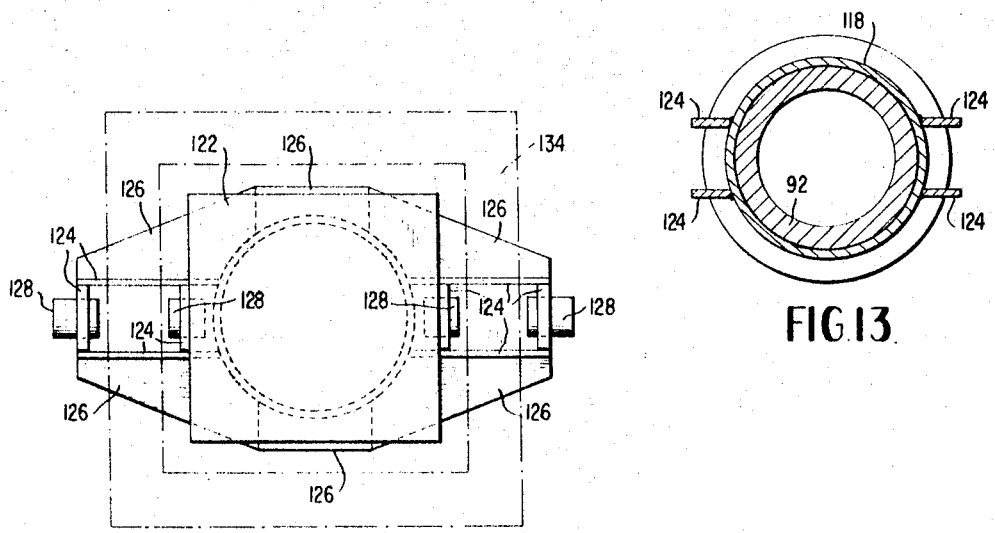
FIG. 13
FIG. 14
INVENTOR.
ANDREW G. SEIPOS
BY Shanley & O'neil
ATTORNEYS

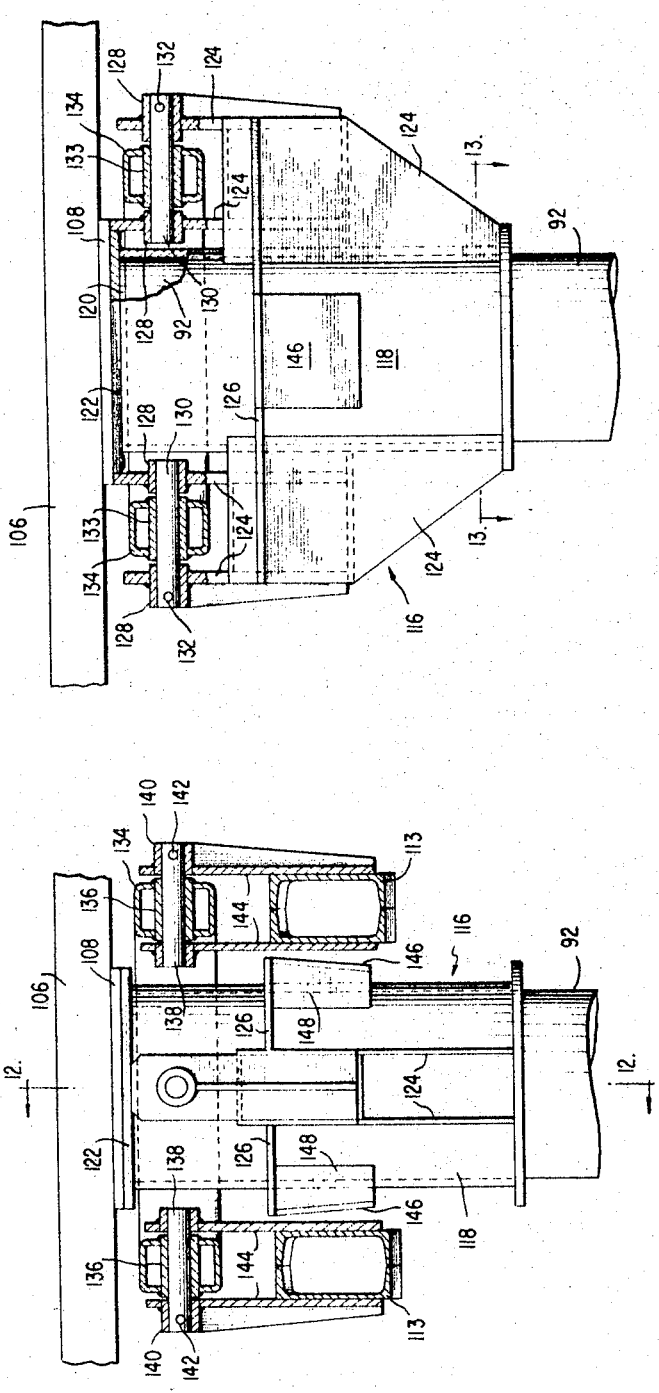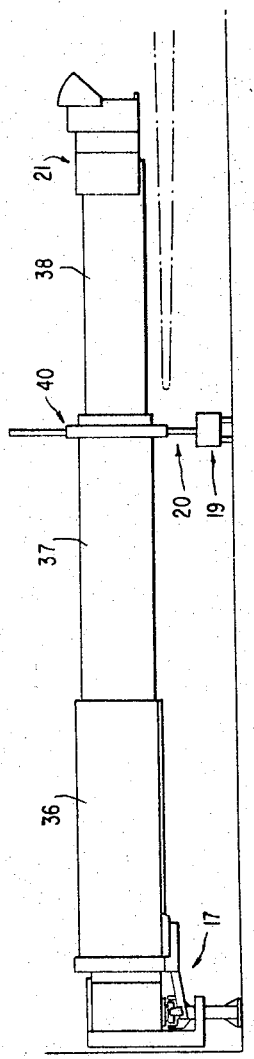

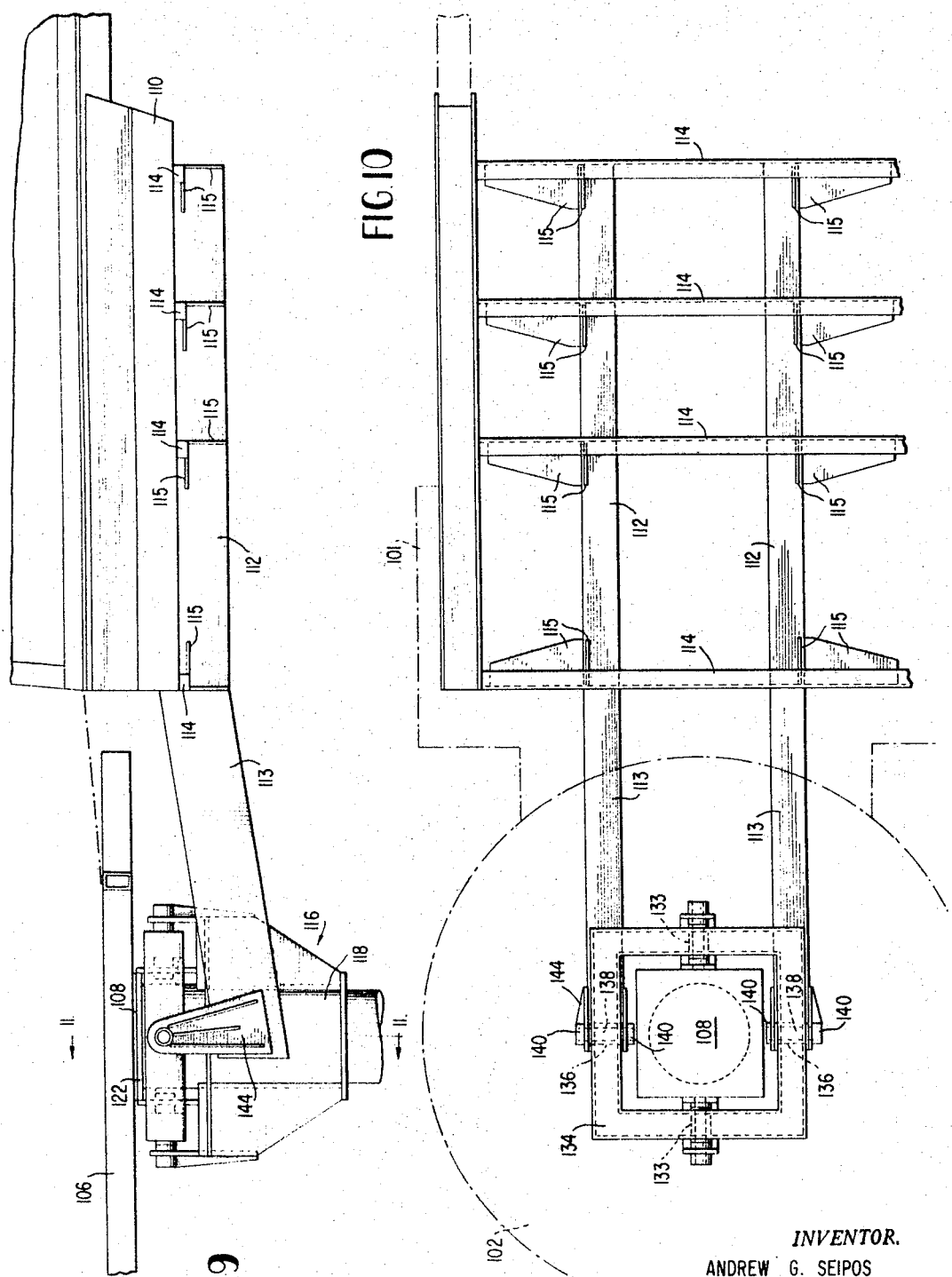

United States Patent Office 3,462,787
Patented Aug. 26, 1969

3,462,787
SWINGABLE AND ELEVATABLE CONVEYANCE LOADER SYSTEM
Andrew G. Seipos, Miami, Fla., assignor, by mesne assignments, to Wollard Aircraft Equipment, Inc., Miami, Fla., a corporation of Washington
Continuation of application Ser. No. 587,086, Oct. 17, 1966. This application May 22, 1968, Ser. No. 732,493
Int. Cl. B65g 11/14, 69/28
U.S. Cl. 14—71                    11 Claims

ABSTRACT OF THE DISCLOSURE

An elevatable and swingable conveyance loader having a vertical pivot near a terminal building component and a supporting structure for the swingable portion at a point spaced from the pivot, the supporting structure comprising an undercarriage including widely spaced ground engaging wheels and elevating mechanism for raising the swingable portion to a considerable height above the ground. The present invention also relates to specific elevating mechanism for the aforementioned combination and novel components thereof. Additionally, the present invention relates to an elevatable and swingable loader having a universal joint pivot at one end near a terminal building component.

This application is a continuation of Ser. No. 587,086, filed Oct. 17, 1966, and now abandoned.

Background of the invention

It is not new to provide a swingable conveyance loader with the conveyance end of the loader being elevatable but in previous structures, the pivot connection of the loader was depended upon to stabilize the loader laterally against wind loads and other laterally directed forces. In the present invention, an improved form of wide-based supporting structure is relied upon to stabilize the loader against lateral thrust forces while the pivot may even be of a universal joint character. This wide based supporting structure in combination with an improved elevating mechanism also permits the use of conveyance loaders which can be elevated to considerable height for the new large airplanes. Where the universal joint swing pivot is used the loader at the same time has improved tolerance for those lateral movements of the structure which result from differences in grade of the apron on which the undercarriage travels.

Description of the invention

Reference is now made to the drawings in which:

FIGURE 1 is a view in side elevation of one form of conveyance loader embodying the present invention;

FIGURE 2 is a front elevational view of one form of elevation mechanism of the present invention taken along the line 2—2 of FIGURE 1 with parts of the loader structure omitted for clarity;

FIGURE 6 is an enlarged fragmentary elevational view in section taken on the line 6—6 of FIGURE 2;

FIGURE 7 is a fragmentary elevational view similar to FIGURE 2 but with movable parts in different relative positions;

FIGURE 8 is a diagrammatic view of a modified form of the loader illustrated in FIGURE 1;

FIGURE 9 is a fragmentary view in side elevation of the preferred form of loader pivot structure and associated loader structure with parts removed for clarity;

FIGURE 10 is a plan view of the structure of FIGURE 9 with parts removed for clarity;

FIGURE 11 is a fragmentary, enlarged view in vertical section taken on the line 11—11 of FIGURE 9;

FIGURE 12 is a fragmentary view in vertical section taken on the line 12—12 of FIGURE 11;

FIGURE 13 is a plan view in section taken on the line 13—13 of FIGURE 12; and

FIGURE 14 is an enlarged plan view of the vertical pivot member showing its relation to associated structure.

Figure 3:
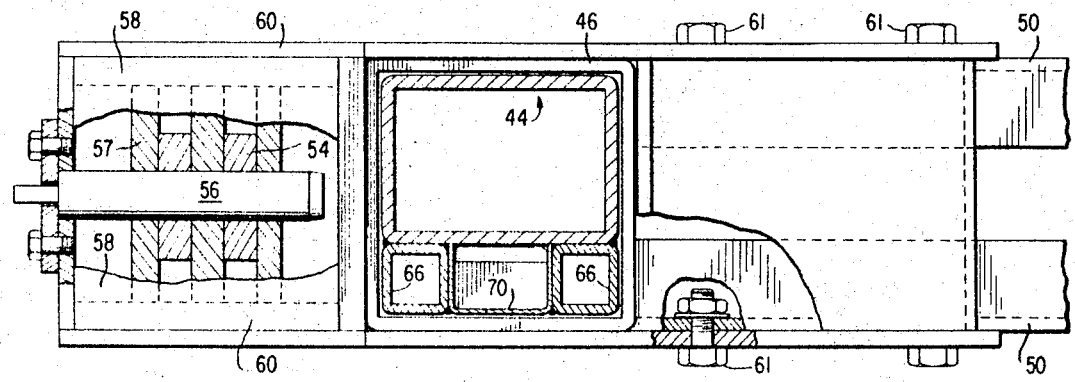
FIGURE 3 is an enlarged fragmentary plan view in section taken on the line 3—3 of FIGURE 2 with parts broken away for clarity.
Figure 4:
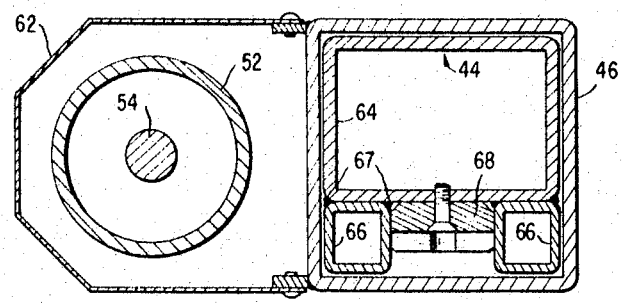
FIGURE 4 is an enlarged plan view taken on the line 4—4 of FIGURE 2.

In FIGURE 1, reference numeral 15 indicates generally an airport terminal building or component part of a terminal building and 16 the usual concrete apron of the airplane loading area.

The form of loader illustrated has a pivotal mounting structure indicated generally at 17 adjacent the terminal building which will be described at greater length below. This pivotal mounting structure provides for both horizontal and vertical swinging movement of the loader. An elongated passageway is indicated generally at 18 and is shown to be extensible in form. Passageway 18 is supported at a point remote from the pivotal mounting structure 17 by an undercarriage structure indicated generally at 19 and a loader supporting and elevating structure indicated generally at 20. A rotatable airplane vestibule structure is shown at 21 but since this forms no part of the present invention further detailed description of this component of the loader will be omitted. The same applies to outside stairway 22. A casing 23 enclosing the undercarriage structure in FIGURE 1 is omitted for clarity in FIGURE 2 and 7.

Referring more particularly to undercarriage structure 19, it will be seen to comprise a structural frame member or chassis 24 supported at widely spaced points by a pair of similar trucks indicated generally at 26, each truck being connected to chassis 24 by a truck mounting member 25 and including a frame member 27 and a pair of wheels 28 mounted on independently rotatable, coaxial axles 30 carried in frame member 27. In the loader position of FIGURE 2 the four axles 30 are disposed in a straight line for extension and retraction of the loader. Between each truck mounting member 25 and truck frame 27 are a vertical pivot structure 32 and a horizontal pivot structure 34. Power means not shown are provided for turning trucks 26 around vertical pivots 32.

Passageway 18 is shown made up of a plurality of telescoping tunnel sections 36, 37 and 38, the tunnel sections being supported relative to one another in any conventional manner or specifically as disclosed in my application Ser. No. 486,659. The outer end of section 38, or as shown in FIGURE 8, section 37, is embraced by a rigid, unitary structural framework indicated generally at 40.

Rigidly supported on chassis 24 of undercarriage structure 19 are a pair of vertically disposed, open ended tubular members 42 which snugly receive and hold the lower end portions of a pair of guide members 44. Framework 40 includes a pair of open ended, tubular side members 46 which snugly receive guide members 44 in sliding relationship. Framework 40 also comprises rigidly connected bottom passageway supporting cross members 48 and rigidly connected top cross members 50. At least the side members 46 and bottom member 48 of framework 40 are rigidly connected to the tunnel section 38 or 37 in any desired manner.

Pivotally mounted on chassis 24 at 51 are a pair of hydraulic jacks or extensible motors 52, each of which includes a cylinder element 53 and a piston element 54, the latter being shown for convenience as a piston rod although it may be a conventional telescoping cylinder received within cylinder 53. The jacks 52 extend upwardly a considerable distance which, considering the necessary overlap of cylinder and piston will give the greatest possible amount of vertical movement of the piston rod on actuation of the motors, the cylinders 53 being shown in the present case as terminating at their upper ends above the top of cross member 50. The upper end of each piston rod 54 is pivotally connected through pin 56 to a saddle member or lifting lug structure 58 which is rigidly carried between a pair of structural plates 60 spanning tubular members 46 and which are in turn bolted at 61 to the top cross member 50 of framework 40. Casings 62 carried by upright members 46 hide jacks 52.

Each guide member 44 is made up of a rectangular tube 64 having two small square tubes 66 rigidly welded thereto throughout its length in spaced relation to each other on one face of tube 64. Positioned between the small tubes 66 and rigidly connected to the same face of each tube 64 is a rack which extends from the upper end of the associated tubular member 42 to an elevated point on guide member 44 which is the highest point to which the floor of tunnel section 38 or 37 will be raised in servicing the largest type airplane. In view of the length of cylinders 53 and piston rods 54 and the great length of guide members 44 relative to tubular side members 46, this height can be considerable. Above the upper end of rack 68 the space between tube 66 is closed by a filler channel 70.

Figure 5:
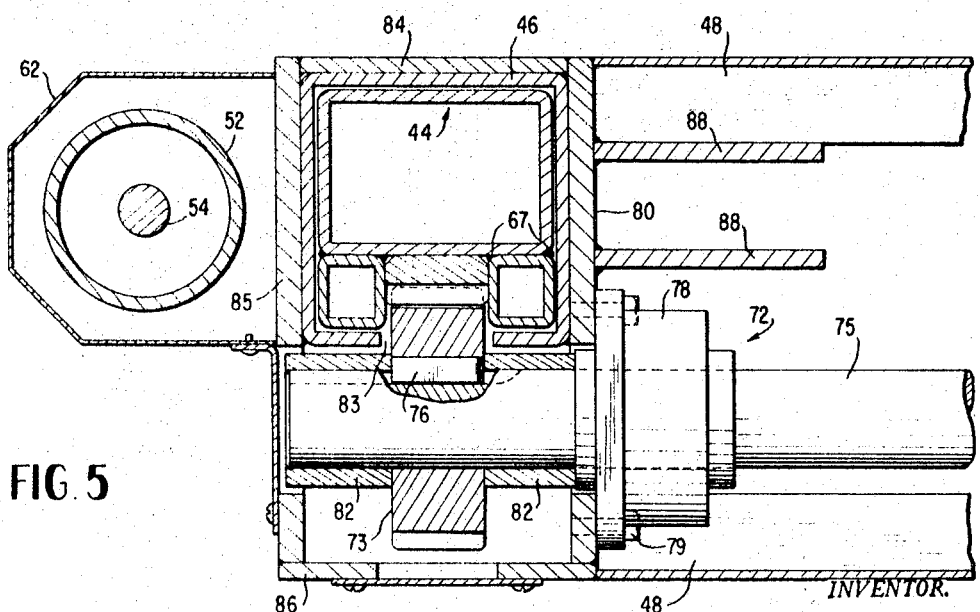
FIGURE 5 is an enlarged fragmentary plan view taken on the line 5—5 of FIGURE 2.

As best shown in FIGURES 5 and 6, a synchronizing mecahnism indicated generally at 72 is located between the bottom frame members 48 of framework 40. This mechanism comprises a pair of identical pinion gears 73 rigidly mounted on a shaft 75 by means of keys 76, the shaft being journaled at each end in bearings 78 attached by stud bolts 79 tapped into a plate 80 which is interposed between bottom cross members 48 and each tubular side member 46 of framework 40. A pair of spacing tubes 82 frictionally fitted on shaft 75 position each stud gear 73 in tooth-meshing relationship with each rack 68 through a slot 83 in tubular side member 46. Plates 84, 85 and 86 complete the framework 40 reinforcing structure in the neighborhood of each end of synchronizing mechanism 72 and a top plate or pad 87 for supporting the tunnel section is welded to the top flanges of bottom cross members 48 with reinforcing gussets 88 acting between plate 80 and plate 87.

In operation the undercarriage 19 and the elevating mechanism 20 act together to mount the outer end portion of the passageway 18 for vertical and horizontal swinging movement while sustaining the tremendous weights resulting from the great length of these new loaders and resisting the lateral forces resulting from the great heights to which these loaders are raised. The swingable weight of these loaders is distributed over a number of wheels, in the present case shown as four wheels carried by two trucks and by virtue of horizontal pivots 32 and vertical pivots 34 these trucks despit their rotatability and spaced wheels can accommodate horizontal and vertical swinging movement of the loader. Optimum solution of the complex tracking problems introduced by coordinated truck movement is the subject of copending application Ser. No. 587,085. In the present invention, the coacting undercarriage structure 19 and elevating mechanism 20 together provide a unified structure which can be tipped to and fro in the direction of the longitudinal axis of the passageway 18 as the elevating mechanism 20 raises and lowers passageway 18 on guide members 44. Since guide members 44 are rigidly connected to chassis 24, the latter has to be free to oscillate to accommodate this tipping motion of guide members 44. The extreme degree of vertical swinging movement of the loader will be appreciated when it is realized that guide members 44 project upwardly beyond tubular side members 46 of frame 40 a distance greater than the height of tunnel section 38 when the loader is in its lowest position. The combined vertical and horizontal pivotal action between the truck frames 27 and the chassis 24 provide for rotation of the trucks from the extension-retraction position shown in FIGURE 2 to achieve swinging movement in the position shown in FIGURE 7. At the same time the trucks in these two positions accommodate tipping movement by the entire structure rocking on the wheels in the truck position of FIGURE 2 and by the chassis 24 pivoting on horizontal pivots 34 in the truck position shown in FIGURE 7. It will be noted that with the trucks in the position of FIGURE 7 the wheels will not follow a satisfactory swing path unless the axes of the wheels of each truck are brought to a position coincident with or nearly coincident with a radial line having the vertical pivot at 17 as its center. In such case, the pivotal connection 34 has to combine with the rocking action of the associated wheels to accommodate the guide member tipping movement but since the horizontal axis of pivots 34 are only a few degrees away from coaxial relationship in a long loader they can be considered substantially coaxial and this results in only minor strain on the parts. A refinement on the structure of the present applications in this respect has been disclosed in Ser. No. 587,085 in conjunction with the coordinated truck movement means disclosed in that application.

By having guide members 44 extend beyond the upper ends of tubular members 46 of framework 40 (except in the highest position of the passageway 18) and by having cylinders 52 of a length exceeding the height of upper cross frame member 50 in the lowest position of the passageway 18, the loader of the present invention can service the largest planes presently contemplated.

In turn, the great heights possible with the present loader are compensated for in respect to the increased problems of lateral stability due to wind loads by designing chassis 24 so that trucks 26 will support the chassis at points beyond the outer extremities of passageway 18 thereby achieving a wide basis for this portion of the loader. In other words, vertical pivots 32 are located farther from the center line or longitudinal axis of tunnel sections 36, 37, 38 than the sidewalls of the largest tunnel section 38.

By cradling passageway 18 in framework 40 and by including as vertical side members of framework 40, tubular side members 46 which snugly receive guide members 44, the present invention presents a smoothly functioning elevating mechanism which is laterally braced by guide members 44 in the most efficient possible manner when the passageway means is at its greatest height.

Guide members 44 are designed to be of the greatest strength and rigidity consonant with cost of materials by being formed of a large tubular member 64 reinforced by small tubular members 66 which act as flanges due to continuous line welding between these parts. Thus, this novel composite tubular structure has the virtues of a channel shaped member with large external areas in contact with large internal areas of tubular side members 46 and within the outlines of which rack 68 is received.

Referring now to FIGURES 9 to 14, inclusive, in conjunction with FIGURE 1, the improved pivotal mounting structure 17 will be described in detail.

Pivotal mounting structure 17 comprises a pedestal having a base 90 supported on apron 16 and a tubular shaft 92 extending upwardly therefrom. Shaft 92 rigidly supports a base 94 on which is mounted a building portal structure 96 and which in turn carries a roof 98 for the vestibule at the terminal building end of the loader. This vestibule has a portal section 100 which projects into portal frame 101 of tunnel section 36 in stung relation in respect to the side walls of the two portals but with room for relative vertical movement between the two portals. The details of this vestibule constitute no part of the present invention except insofar as the floor 102 of the vestibule and the conventional sidewall curtains 104 are carried by pivotal mounting structure 17. Vestibule floor 102 is supported by frame 106 and frame 106 is rigidly mounted on the top plate 108 of pivotal mounting 17.

The terminal building end of tunnel section 36 has a base framework 110 carrying a pair of arms 112 with downwardly inclined end portions 113. Arms 112 are mounted on base structure 110 and braced by conventional structure including cross bracing members 114 and gussets 115.

Arm extensions 113 support the terminal building end of the loader for vertical and horizontal swinging movement plus limited rotations or twisting movement of passageway 18 around its longitudinal axis, by a universal joint structure mounted on the top of tubular shaft 92. This universal joint structure incorporates a vertical pivot member indicated generally at 116 which is made up of a tubular portion 118 encompassing the upper end of tubular shaft 92. At the top of shaft 92 is an antifriction bearing plate 120 and if desired antifriction bearing means may be introduced between the exterior cylindrical surface of shaft 92 and the interior cylindrical surface of tube 118 but for simplicity of disclosure such elements are not shown. Tubular portion 118 carries at its top end a plate 122 which is rigidly fastened in any desired manner such as by bolting, not shown, to plate 108 carried by frame 106, plate 122 being welded to the top edge of tube 92 and resting on bearing plate 120. Tubular portion 118 and plate 122 support a structure built up from vertically disposed plates 124 and horizontally disposed plates 126 for supporting two pairs of gudgeons 128 which carry coaxial shafts 130 secured against rotation by pins 132.

Rotatably mounted on shaft 130 by bearing members 133 is a gimbal structure 134 shown in rectangular form (see FIGURES 10 and 14). At 90° away from each bearing member 133, gimbal 134 carries a pair of coaxially disposed bearing members 136 rotatably receiving shafts 138 which are fixed in gudgeons 140 by pins 142. Gudgeons 140 are mounted in two hangers 144 which are arranged in pairs and in turn are rigidly connected as by welding to arm extensions 113.

In opposing relation to the inwardly facing hangers 144 are plates 146 supported by radially disposed spacer plates 148 which have their inwardly directed edges welded to the tubular member 118 of pivotal mounting structure 116. Plates 146, which are disposed at a slight angle of for example 3° to the associated hangers 144, act as bumpers to prevent extreme tilting movement of gimbal 134.

Operation of pivotal mounting structure 17 and its universal joint characteristics will be evident from the drawings and the foregoing description. By use of this universal joint structure differences in grade of the concrete apron and their effects as transmitted through undercarriage 19 and elevating mechanism 20 passageway 18 are absorbed up to 3° in either direction by the gimbal mounting. It is to be understood however that the universal joint action introduced by the gimbal structure is not an essential element of the loader combination disclosed but does operate in conjunction with the remainder of the structure to eliminate stresses and strains that must otherwise be absorbed by the structural parts of the loader between the undercarriage 19 and the pivotal mounting 17.

I claim:

1. A conveyance loader for connecting a component of a building and a conveyance comprising
   (a) an elongated passageway means,
   (b) a pivotal support for the building end of the passageway means,
   (c) a mobile undercarriage support for the passageway means spaced from the pivotal support toward the conveyance end of the passageway means,
   (d) elevating means for the passageway means carried by the mobile undercarriage support,
   (e) a plurality of wheel mounting means and associated ground engaging wheels carried by the undercarriage support, one of the wheel mounting means being disposed on either side of the longitudinal axis of the passageway means and spaced from the longitudinal axes a distance greater than one-half the greatest width dimension of the passageway means, and
   (f) universal joint means incorporated in the pivotal support for the building end of the passageway means.

2. In a conveyance loader for connecting a component of a building and a conveyance in which elongated passageway means are supported by first support means at the building end of the passageway means for swinging movement of the passageway means in both horizontal and vertical planes and in which the passageway means are supported by a second support means at a point spaced along the length of the passageway means from the building end the second support means being comprised of a mobile undercarriage means and an elevating means which together support the passageway for swinging movement of the conveyance end thereof in horizontal and vetrical planes, the combination comprising:
   (a) structural frame means for the undercarriage means,
   (b) wheel mounting means and ground engaging wheel means supporting the structural frame means for rocking movement of the structural frame means around an axis parallel to and spaced above the ground and substantially normal to the longitudinal axis of the elongated passageway means,
   (c) a pair of parallel, upwardly extending, elongated guide members, each guide members having a first longitudinal surface facing toward the conveyance end of the loader and a second longitudinal surface facing away from the conveyance end of the loader, the lower end portions of the guide members being rigidly supported by the structural frame means with one guide member on each side of the passageway means,
   (d) a guide member receiving means rigidly connected to the passageway means on each side thereof contiguous to the associated guide member, each guide member receiving means having means contiguous to the uppermost and lowermost parts of the passageway means for guiding engagement with both the first and second surfaces of each guide member on relative movement of the guide members and the guide member receiving means during vertical swinging movement of the passageway means,
   (e) lifting lug means associated with each side of the passageway means at a point above the lowermost part of the passageway means, and
   (f) an extensible motor means associated with each side of the passageway means having one end in supporting relation to the associated lifting lug and having the other end in supported relation to the structural frame means for lifting and lowering the passageway means relative to the undercarriage.

3. Apparatus as claimed in claim 2 including:
   (g) rack means carried by each guide member extending upwardly along the length of the guide member, both rack means being located in the same plane,
   (h) a pinion gear in engagement with each rack means and a shaft rigidly connecting the pinion gears together, the shaft and pinion gears being freely rotatable as a unit, and
   (i) bearing means rigidly mounted relative to the passageway means rotatably receiving the shaft.

4. Apparatus as claimed in claim 2 in which the guide members project upwardly beyond the uppermost part of the passageway means when the passageway means are in lowermost position.

5. Apparatus as claimed in claim 2 in which each lifting lug means is associated with the passageway means at a point contiguous to the uppermost part of the passageway means.

6. Apparatus as claimed in claim 2 in which a rectangular framework made up of a pair of side members and an upper and lower cross member embraces the passageway means at said point spaced along the length of the passageway means, the guide member receiving means comprise the side members of the framework, and the lifting lug means are connected to the framework at points above the passageway means.

7. Apparatus as claimed in claim 2 in which the extensible motor means are positioned beyond the sides of the passageway means in a direction away from the longitudinal axis of the passageway means and the wheel mounting means connect the wheels to the structural frame means at points beyond the extensible motor means relative to the longitudinal axis of the passageway means.

8. An undercarriage structure for a conveyance loader comprising
   (a) an elongated structural frame member,
   (b) a pair of short, upstanding, tubular members open at their upper ends and rigidly connected at their lower ends to the upper side of the structural frame member, each tubular member being equally spaced from a point on the structural frame member corresponding to the midpoint of the loader,
   (c) a pair of wheel mounting means carried on the underside of the structural frame member each wheel mounting means being located beyond the tubular members relative to the midpoint of the loader, and
   (d) mounting means for an extensible motor carried by the upper side of the structural frame member between each tubular member and each wheel mounting means.

9. A composite guide member for a conveyance loader comprising
   (a) a first elongated tubular member of constant rectangular cross section,
   (b) a pair of smaller elongated tubular members of constant rectangular cross section arranged along one face of the first tubular member and in spaced relation to each other to form a channel extending along the length of the composite member,
   (c) continuous weld means between each smaller tubular member and the first tubular member to integrate the three members into a single composite member of substantially uniform strength along the length thereof, and
   (d) elongated rack means within the channel of the composite member and integrated with the composite member, the teeth of the rack means facing outwardly of the channel and having a height not greater than the depth of the channel.

10. In a conveyance loader for connecting a component of a building and a conveyance in which elongated passageway means are supported by first support means at the building end of the passageway means for swinging movement of the passageway means in both horizontal and vertical planes and in which the passageway means are supported by a second support means at a point spaced along the length of the passageway means from the building end, the second support means being comprised of a mobile undercarriage means and an elevating means which together support the passageway for swinging movement of the conveyance end thereof in horizontal and vertical planes, the combination comprising:
   (a) rotatable means carried by the first support means for rotation about a vertical axis intersecting the longitudinal axis of the elongated passageway means,
   (b) arm means carried by the passageway means on each side of the longitudinal axis of the passageway means projecting toward the vertical axis of the rotatable means,
   (c) first pivot means carried by the rotatable means for pivotal movement around a horizontal axis disposed contiguous to a vertical plane including the longitudinal axis of the passageway means,
   (d) second pivot means carried by the first pivot means for pivotal movement around an axis disposed at 90° to the axis of pivotal movement of the first pivot means, and
   (e) means connecting the second pivot means on each side of the longitudinal axis of the passageway means with the arm means.

11. Apparatus as claimed in claim 10 in which:
   (g) first pivot means (d) comprise a pair of pivot supports and a gimbal ring pivotally supported on the pivot supports, and
   (h) the second pivot means are carried by the gimbal ring.

References Cited
UNITED STATES PATENTS

| | | | |
|---|---|---|---|
| 2,478,177 | 8/1949 | Beutel | 14—71 |
| 2,641,785 | 6/1953 | Pitts | 14—71 |
| 2,688,761 | 9/1954 | Good | 14—71 |
| 2,875,457 | 3/1959 | Read | 14—71 |
| 3,184,772 | 5/1965 | Moore | 14—71 |
| 3,263,253 | 8/1966 | Wollard | 14—71 |

NILE C. BYERS, JR., Primary Examiner